Figure 1:
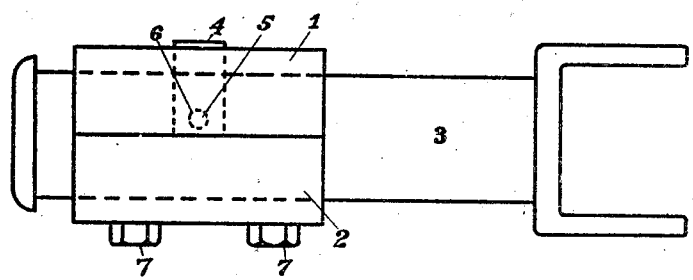

J. B. BRINDAMOUR.
AUTOMOBILE STEERING WHEEL LOCK.
APPLICATION FILED MAR. 20, 1920.

1,437,717.

Patented Dec. 5, 1922.

INVENTOR.
John B Brindamour

Patented Dec. 5, 1922.

1,437,717

UNITED STATES PATENT OFFICE.

JOHN B. BRINDAMOUR, OF SAN FRANCISCO, CALIFORNIA, ASSIGNOR OF ONE-HALF TO MILTON A. RUSH, OF SAN FRANCISCO, CALIFORNIA.

AUTOMOBILE STEERING-WHEEL LOCK.

Application filed March 20, 1920. Serial No. 367,498.

*To all whom it may concern:*

Be it known that I, JOHN B. BRINDAMOUR, a citizen of the United States, and a resident of the city of San Francisco, and county of San Francisco, State of California, have made a new and useful invention, to wit: Improvements in Automobile Steering-Wheel Locks; and I hereby declare the following to be a full, clear, concise, and exact description of the same.

This invention relates to locking devices primarily designed for use in connection with automobiles to prevent theft or use of the latter by unauthorized persons.

In carrying out the invention I provide a device of the above mentioned character which is simple in construction and designed to be readily and easily secured to the steering column of the vehicle and including a locking element adapted to embrace one of the spokes of the steering wheel to prevent turning of the latter so that the vehicle cannot be steered should an attempt be made to steal the same.

The nature and advantages of the invention will be better understood when the following detailed description is read in connection with the accompanying drawings, the invention residing in the construction, combination and arrangement of parts as claimed.

Figure 2:
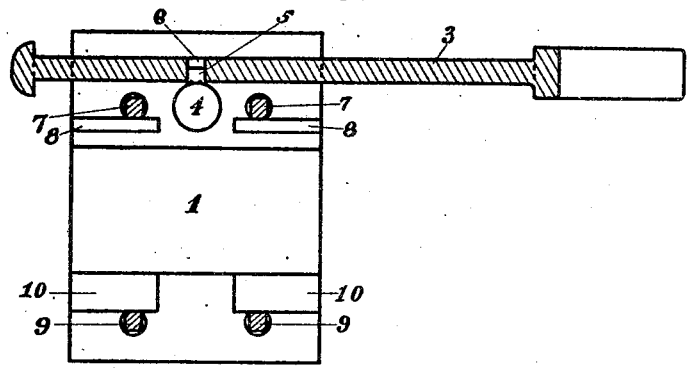
Figure 3:
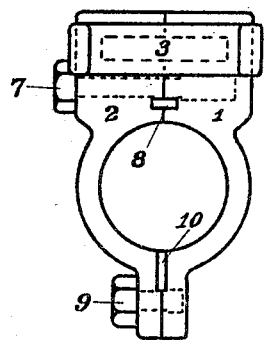

In the drawings forming part of this application like numerals of reference indicate similar parts in the several views and wherein:

Figure 1 is a top plan view.
Figure 2 is a side elevation.
Figure 3 is an end elevation and
Figure 4 is a view showing the manner of using the device.

Figure 4:
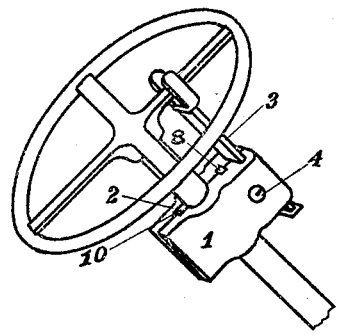

The device forming the subject matter of my invention embodies two members identical in construction and indicated at 1 and 2 respectively, the members being arranged in face to face contact and having their confronting sides recessed to snugly receive the steering column of the vehicle as illustrated in Figure 4. The members 1 and 2 may be secured in any suitable manner and are herein shown as bolted together. The said confronting sides of these members are further formed with keyways 8 to receive keys 10 which are slidably fitted within said keyways and arranged tangentially to the bolts 9 to prevent casual separation of the bolts from the members as will be understood. The members 1 and 2 are further provided with communicating grooves defining a channel through which the locking element 3 slides, this element being formed with a head at one end and a substantially U shaped portion at the opposite end for a purpose to be presently described. The locking element 3 may vary in dimensions, and when in applied position upon the steering column of the vehicle slides parallel thereto. As clearly shown in Figure 4 the U shaped extremity of this locking element is adapted to embrace one of the spokes of the steering wheel so as to prevent turning of the latter, or in other words to prevent the vehicle from being properly steered should an attempt be made to steal the latter with the device in the position shown in Figure 4.

In order to hold the locking element fixed against movement in its active position, the member 1 has rotatably fitted therein a key actuated cylinder lock including a spring pressed bolt or lug 5 which is adapted to be received by an opening in the locking bar 3 when the locking element is in the position shown in Figure 4. By reason of this fact the locking element cannot be moved away from the steering wheel by any one other than the owner or driver of the vehicle. Manifestly I have devised a locking device which can be quickly and easily applied to the steering column of any make of vehicle without altering or in any way changing the latter, the device being easy of manipulation and very efficient for the purpose intended.

While it is believed that from the foregoing description and the accompanying drawings, the nature and advantages of the invention will be readily apparent, I desire to have it understood that I do not limit myself to what is herein shown and described and that such changes may be resorted to when desired as fall within the scope of what is claimed.

What I claim is:

A steering wheel lock for vehicles comprising two identically constructed members designed to embrace the steering column and having their portions at opposite sides of said column arranged in face to face contact, fastening bolts passed through said members for holding the latter fixed relatively, the adjacent faces of the respective members at one side of the steering column having alined grooves, a key adapted to be slid into said grooves tangentially to one of said bolts, bearing against the latter and said steering column, the confronting faces of said members at the opposite side of the steering column having alined grooves, a second key arranged in right angular relation to the first mentioned key, and adapted to be passed through the latter mentioned grooves tangentially to the adjacent bolt, contacting the latter for the purpose specified, the confronting faces of said members being further formed to provide additional grooves adapted to align when said members are associated, a locking element slidably fitted between said members and in the last mentioned grooves, and having an opening, a key controlling means for holding said locking element immovable in active position, said means including a bolt adapted to be received by the opening in said element, and a yoke carried by the upper end of said element and adapted to straddle the adjacent spoke of the steering wheel.

JOHN B. BRINDAMOUR.